United States Patent [19]

Hasegawa

[11] Patent Number: 5,392,180
[45] Date of Patent: Feb. 21, 1995

[54] MAGNETIC HEAD DRUM FOR VIDEO DATA RECORDING AND READING APPARATUS

[75] Inventor: Shinichi Hasegawa, Chiba, Japan

[73] Assignee: Sony Corporation, Tokyo, Japan

[21] Appl. No.: 883,763

[22] Filed: May 15, 1992

[30] Foreign Application Priority Data

May 30, 1991 [JP] Japan .................. 3-126432

[51] Int. Cl.6 .............. G11B 5/52; G11B 15/60
[52] U.S. Cl. .................... 360/107; 360/108; 360/130.24
[58] Field of Search ........... 360/107, 84, 85, 130.23, 360/130.24, 108; 361/413

[56] References Cited

U.S. PATENT DOCUMENTS

| | | | |
|---|---|---|---|
| 4,400,751 | 8/1983 | Tominaga | 360/107 |
| 4,514,784 | 4/1985 | Williams et al. | 361/413 |
| 4,564,876 | 1/1986 | Takahashi et al. | 360/107 |
| 4,641,214 | 2/1987 | Imanishi et al. | 360/84 |
| 4,819,131 | 4/1989 | Watari | 361/413 |
| 4,875,110 | 10/1989 | Kazama et al. | 360/64 |
| 4,912,772 | 3/1990 | Beaudry, Jr. et al. | 361/413 |
| 4,970,611 | 11/1990 | Kodama et al. | 360/107 |
| 5,086,361 | 2/1992 | Kawada et al. | 360/107 |
| 5,113,298 | 5/1992 | Fukushima et al. | 360/108 |
| 5,195,001 | 3/1993 | Murakami et al. | 360/130.23 |
| 5,212,610 | 5/1993 | Falk et al. | 360/107 |

FOREIGN PATENT DOCUMENTS 61-92402  5/1986  Japan ................... 360/108

*Primary Examiner*—John H. Wolff
*Assistant Examiner*—Allen Cao
*Attorney, Agent, or Firm*—William S. Frommer; Alvin Sinderbrand

[57] ABSTRACT

A magnetic head drum of a helical-scan type for a data record/read apparatus comprises upper and lower stationary drums securely mounted on a stationary spindle, a rotary drum rotatably supported on the spindle, and a motor for rotating the rotary drum around the spindle. The motor comprises a rotor secured to the rotary drum, a stator secured to the upper drum, and a back yoke supported on the rotor. The upper drum is accomodated within the rotary drum in radially remote relationship thereto. The stator is electrically connected to a flexible circuit board by a connecting arrangement mounted on the upper drum.

7 Claims, 3 Drawing Sheets

MAGNETIC HEAD DRUM FOR VIDEO DATA RECORDING AND READING APPARATUS

BACKGROUND OF THE INVENTION

The present invention relates to a magnetic head drum of a helical-scan type for magnetically recording and reading video data on magnetic tape.

Such a magnetic head drum known in the art comprises a stationary spindle, a stationary drum secured to the spindle, a rotary drum rotatably supported on the spindle, and a motor for rotating the rotary drum. The stationary drum includes a cylindrical side wall having a helical guide shoulder for helically guiding magnetic tape thereon on its outer circumferential face. The rotary drum includes a cylindrical side wall having at its outer periphery a magnetic head for recording and reading video signals on the magnetic tape. The motor comprises a rotor secured to the rotary drum, a stator securely connected to the spindle so as to be remote at a predetermined distance from the rotor, and a back yoke secured to a top end of the cylindrical side wall of the rotary drum. A transformer for the stator is secured to the stationary drum in opposed relationship to a transformer for the rotor which is secured to the rotary drum and electrically connected to the magnetic head. The stator is electrically connected to a flexible circuit board via a guide protector which extends radially and outwardly from a top end portion of the spindle above the rotary drum so that the flexible circuit board is remote from the back yoke mounted on the rotary drum. Further, the stator is provided with a damper member in order to restrain vibration of the stator upon rotation of the rotary drum around the spindle. The vibration causes a noise, viz, electromagnetic noise of the motor.

However, since the vibration of the stator upon rotation is not sufficiently restrained by the damper member, electromagnetic noise is still generated. Further, provision of the damper creates a drawback in that the total weight of the magnetic head drum is increased.

In addition, since the guide protector is projectingly arranged above the rotary drum, reduction in height and weight of the magnetic head drum is disturbed.

There is great demand for a magnetic head drum which is rotatable at high speed without generating electromagnetic noise and which has reduced size and weight.

SUMMARY OF THE INVENTION

A principal object of the present invention is to provide an improved magnetic head drum capable of damping an electromagnetic noise generated upon rotation.

The present invention provides a magnetic head drum for a data record/read apparatus, comprising: a lower drum securely mounted on a stationary spindle, a rotary drum rotatably supported on the spindle, an upper drum securely mounted on the spindle, a magnetic head mounted on an outer periphery of the rotary drum, and a motor for rotating the rotary drum around the spindle.

The motor has a stator securely mounted on the upper drum, a rotor securely mounted on the rotary drum, and a back yoke supported on tile rotor. The stator is interposed between the rotor and the back yoke.

The upper drum is accomodated within the rotary drum in radially remote relationship to the rotary drum.

DESCRIPTION OF THE PREFERRED EMBODIMENT

Figure 1:
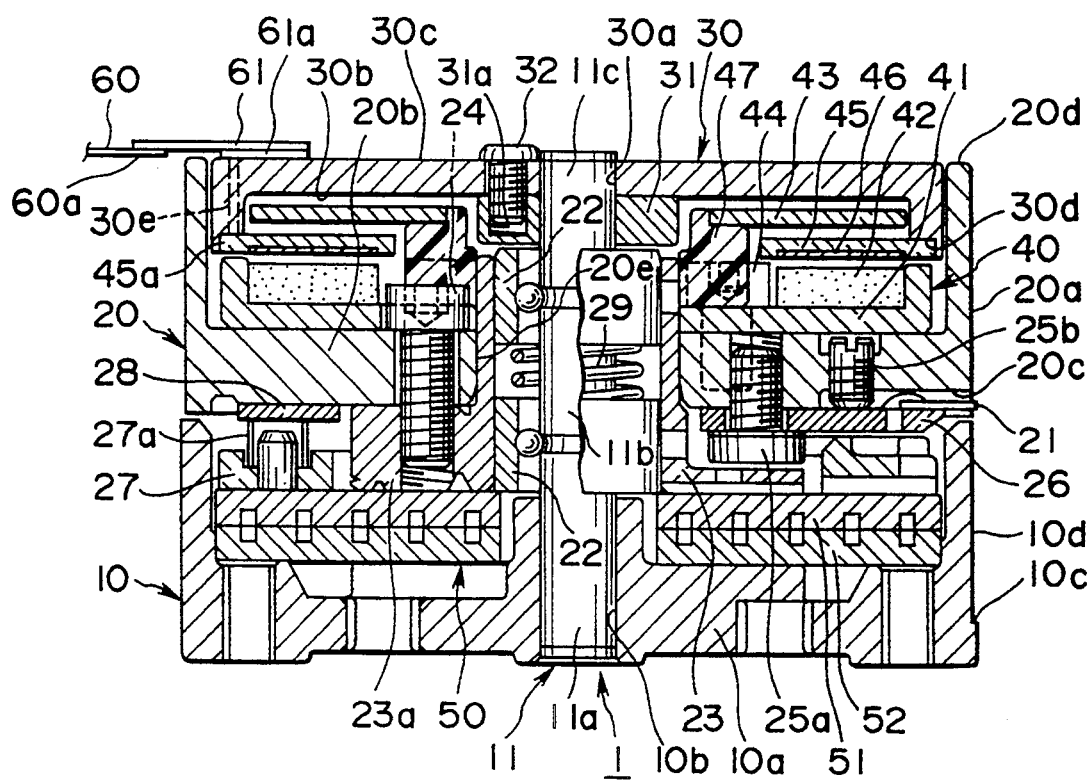
FIG. 1 is a sectional view of one preferred embodiment of a magnetic head drum according to the present invention.

Referring now to FIG. 1, a magnetic head drum 1 according to the present invention comprises a stationary spindle 11 vertically extends along a center axis thereof, cylindrical lower and upper stationary drums 10 and 30 securely mounted on the spindle 11 and a cylindrical rotary drum 20 rotatably supported on the spindle 11.

As shown in FIG. 1, the lower drum 10 has a disk-like bottom wall 10a and a cylindrical side wall uprightly extending from an outer periphery of the bottom wall 10a around the spindle 11. The bottom wall 10a has a cylindrical central opening 10b into which the spindle 11 is press-fitted. The cylindrical side wall has, on an outer circumferential face 10d thereof, a helical guide shoulder 10c for helically guiding magnetic tape (not shown) therearound. A pair of annular bearings 22, 22 are mounted on the spindle 11 in axially spaced relationship to each other. A coil spring 29 is mounted on a mid-portion 11b of the spindle 11 between the bearings 22, 22, in order to prevent the bearings 22, 22 from dislocating on the spindle 11. A flanged sleeve 23 is mounted on the bearings 22, 22 so as to be rotatably supported thereon. The sleeve 23 has a cylindrical body portion and a flange 23a extending radially and outwardly from the cylindrical body portion.

As shown in FIG. 1, mounted on the sleeve 23 is the rotary drum 20 having a disk-like bottom wall 20b and a cylindrical side wall uprightly extending from an outer periphery of the bottom wall 20b. The bottom wall 20b has a central opening 20e which is concentric with the central opening 10b of the lower drum 10. Fitted into the central opening 20e is the sleeve 23 mounted on the spindle 11. The rotary drum 20 is secured on the sleeve 23 by means of a set screw 24 inserted into through-holes which are formed on the bottom wall 20b and the flange 23a of the sleeve 23 in an aligned manner. Accordingly, the rotary drum 20 is rotatably supported on the mid-portion 11b of the spindle 11 through the bearings 22, 22 and the sleeve 23. The bottom wall 20b of the rotary drum 20 has a lower face on which a magnetic head-mounting base 26 is secured by means of a set screw 25a. The base 26 has a magnetic head 21 attached to an outer periphery thereof by an adhesive or the like and received in a recess 20c formed on the lower face of the bottom wall 20b. The bottom wall 20b has a through-hole passed therethrough in a region of the recess 20c, into which a set screw 25b is fitted. By tightening or untightening the set screw 25b, an axial position of the base 26 is adjustable relative to the lower face of the bottom wall 20b.

As shown in FIG. 1, an annular collar 31 and the upper drum 30 are fitted on the spindle 11 above the sleeve 23. The annular collar 31 has a central opening aligned with the central opening 10b of the lower drum 10. The upper drum 80 has a disk-like top wall and a cylindrical side wall extending downwardly from an outer periphery of the top wall. The top wall also has a central opening 30a aligned with the central opening 10b of the lower drum 10. A top end 11c of the spindle 11 is fitted into the central opening of the annular collar 13 and the central opening 30a. The top wall of the upper drum 30 and the annular collar 31 are secured together by means of a set screw 32 screwed into a threaded hole 31a of the collar 31 from above the top wall. As a result, a top end 20d of the cylindrical side wall of the rotary drum 20 is substantially flush with an upper face 30c of the top wall of the upper drum 30. The collar 31 serving as means for supporting the upper drum 30 on the spindle 11 may be integrally formed with the spindle 11. The cylindrical side wall of the upper drum 30 has a shorter outer diameter than an inner diameter of the cylindrical side wall of the rotary drum 20 so that the upper drum 30 is accommodated within the rotary drum 20 upon assembly. There exists a radial clearance between the side walls of the rotary drum 20 and upper drum 30.

As illustrated in FIG. 1, the magnetic head drum 1 further comprises a motor 40 for rotating the rotary drum 20, which includes a flanged annular disk-like rotor 41 and an annular disk-like stator 45. The rotor 41 is fitted around the cylindrical body portion of the sleeve 23 and secured to the bottom wall 20b of the rotary drum 20 by means of a bolt 44. An annular magnet 42 is secured on the rotor 41 in such a manner that an outer periphery of the magnet 42 abuts against an inside face of the flanged portion of the rotor 41. A back yoke retainer 47 made of a damping material such as polyester elastomer, rubber or the like is securely fitted onto a top end of the cylindrical body portion of the sleeve 23 so as to be supported on an upper face of the rotor 41. An annular back yoke 43 is supported at its inner end portion on a top end face of the back yoke retainer 47 and extends radially outwardly in opposed and spaced relationship to the top wall of the upper drum 30 up to near the cylindrical side wall thereof. Accordingly, the back yoke 43 rotates together with the rotor 41 within the upper drum 30 and without contact therewith. The back yoke 43 is made of a laminated plate composed of upper and lower steel films and a resin layer interposed therebetween. Such material and structural characteritics of the back yoke 43 and the back yoke retainer 47 serve for damping vibrations caused by rotation of the rotor 41.

The annular stator 45 has an outer circumferential edge 45a secured by an adhesive to a stepped portion 30d which is formed on an inner circumferential face of the cylindrical side wall of the upper drum 30. The stator 45 is opposed in spaced relationship to the rotor 41 with the magnet 42, the back yoke 43 and the back yoke retainer 47. This structure of the stator 45 is helpful for reducing vibrations caused upon the rotation of the rotor 41. The stator 45 has on its lower face a coil 46 spaced at a predetermined distance from the magnet 42 secured to the rotor 41.

As seen in FIG. 1, between the lower drum 10 and the rotary drum 20 is disposed a transformer unit 50 comprising a transformer 51 for the rotor 41 and a transformer 52 for the stator 45. The transformer 52 is affixed, by an adhesive or the like, on an upper face of the bottom wall 10a of the lower drum 10. Although not s shown, a flexible circuit board for the transformer unit 50 is secured to a lower face of the bottom wall 10a of the lower drum 10 through a terminal plate (not shown) by a plurality of pins (not shown). The transformer 51 is attached by an adhesive or the like to a lower face of the flanged sleeve 23. Thus, a lower face of the transformer 51 and an upper face of the transformer 52 are opposed in spaced relationship to each other. Mounted near an outer periphery of the transformer 51 is a terminal plate 27 with a head contact terminal 27a which is connected to a circuit board 28 fixed on the bottom wall 20b of the rotary drum 20. The transformer 51 is electrically connected through the circuit board 28 to the magnetic head 21 secured on the bottom wall 20b of the rotary drum 20.

In assembly, first the spindle 11 is fitted to the lower drum 10 and then the rotary drum 20 including the magnetic head 21, the rotor 41 and the back yoke 43, is mounted on the spindle 11 via the bearings 22, 22 and the sleeve 23. Respective outer circumferential faces 10d and 20a of the lower drum 10 and rotary drum 20 are substantially flush with each other. Magnetic tape is helically guided while being contacted with the outer circumferential faces 10d and 20a. The upper drum 30 with the stator 45 is mounted on the spindle 11 so as to be disposed within the rotary drum 20.

Figure 2:
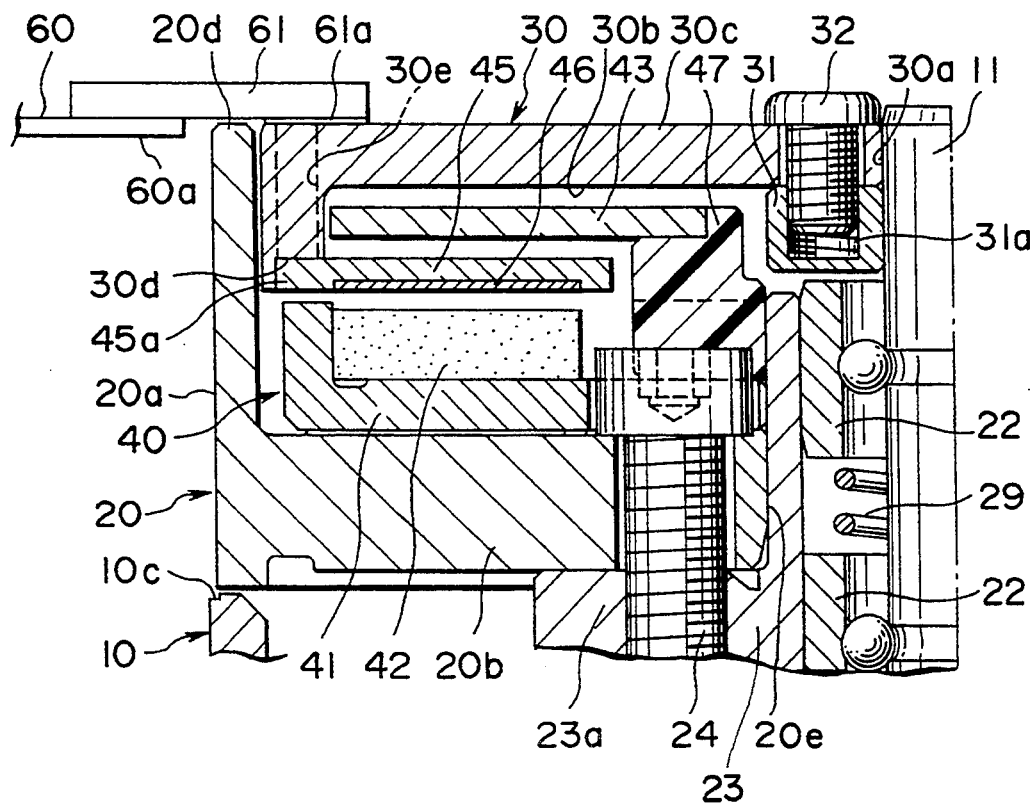
FIG. 2 is an enlarged view of FIG. 1 which shows a joint portion where a stator and a flexible circuit board are connected to each other.

As shown in FIG. 2, a support plate 61 is supported on a seat 61a secured by an adhesive or the like to an upper face 30c of the top wall of the upper drum 30 near the outer periphery thereof. The support plate 61 extends radially and outwardly over the top end 20d of the rotary drum 20. The support plate 61 and the seat 61a are made of a rigid resin material and have thicknesses of about 0.5 mm and about 0.1–0.2 mm, respectively. Accordingly, the support plate 61 is axially remote from the top end 20d of the cylindrical side wall of the rotary drum 20. The seat 61a may be integrally formed with the support plate 61. A flexible circuit board 60 has an end 60a which is secured to a lower face of the support plate 61 in radially spaced relationship to an outer circumferential face 20a of the cylindrical side wall of the rotary drum 20. The flexible circuit board 60 has about 0.3 mm thickness and a sufficient bending strength so that the support plate 61 is free from possible strain caused upon application of axial load onto the flexible circuit board 60.

Figure 3:
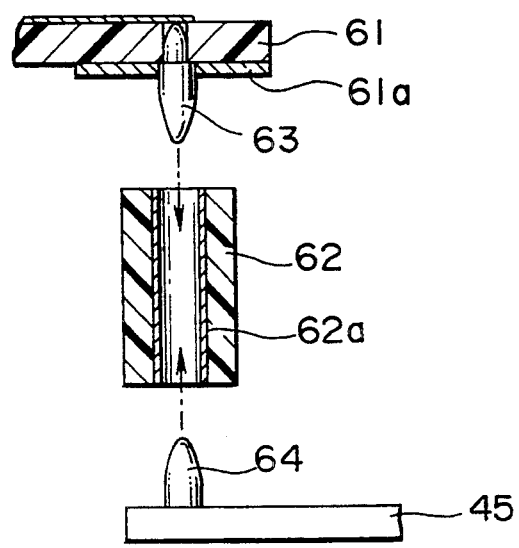
FIG. 3 is an exploded view of the joint portion of FIG. 2, in which a combination of connector and connector pins is shown.

As shown in FIGS. 2 and 3, the cylindrical side wall of the upper drum 30 has an axially extending throughhole 30e into which a tubular connector 62 is fitted. The connector 62 is made of a resin and has a plated inner face 62a. Connector pins 63 and 64 are respectively secured to the support plate 61 and the stator 45 and fitted into opposite ends of the connector 62, respectively. Upon insertion, the connector pins 63 and 64 are electrically connected to each other, so that the flexible circuit board 60 is electrically connected to the coil 46 of the stator 45.

Figure 4:
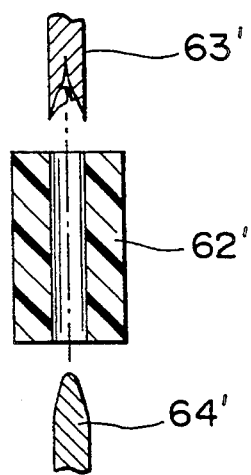
FIG. 4 is an exploded view of a second embodiment of a magnetic head drum according to the present invention, in which another combination of connector and connector pins is shown.

Referring to Fig.4, a second embodiment of a magnetic head drum according to the invention is explained. The second embodiment is substantially the same as the first embodiment except the structure of a tubular connector 62' and connector pins 63' and 64'.

As shown in FIG. 4, the connector 62' is made of a resin but an inner face thereof is not plated. The connector pins 63' and 64' are in female and male configurations, respectively, so as to engage each other upon fitting to the connector 62'.

In addition to the arrangement of the upper drum inside the rotary drum mentioned hereinbefore, this provision of the connector and the connector pins is effective for reducing the height and weight of the magnetic head drum because projecting portions such as terminals or soldered contacts are not required.

What is claimed is:

1. A magnetic head drum for a data record/read apparatus, comprising:
   a stationary spindle having a longitudinal axis,
   a lower drum mounted fixedly on said stationary spindle,
   a rotary drum rotatably supported on said spindle above said lower drum and having an upwardly opening annular recess,
   an upper drum mounted fixedly on said spindle and accommodated within said recess of the rotary drum with radial clearance from said rotary drum,
   a magnetic head mounted on said rotary drum at an outer periphery of the bottom of said rotary drum and
   a motor for rotating said rotary drum around said spindle, said motor including a stator mounted fixedly on said upper drum within said recess of the rotary drum, a rotor mounted within said recess of said rotary drum for rotation with the latter in confronting relation to said stator, and a back yoke supported on said rotor with said stator being interposed between said rotor and said back yoke within said recess of the rotary drum so that said bottom of the rotary drum shields said magnetic head from said stator, rotor and back yoke of said motor within said recess of the rotary drum.

2. A magnetic head drum as claimed in claim 1, wherein said magnetic head drum has a helical guide path for helically guiding magnetic tape on an outer circumferential face thereof.

3. A magnetic head drum as claimed in claim 1, further comprising:
   a flexible circuit board support member secured to said upper drum and extending radially and outwardly therefrom above said rotary drum,
   a flexible circuit board, supported by said flexible circuit board support member, in remote relationship to said rotary drum, and
   connecting means extending through said upper drum for electrically connecting said stator with said flexible circuit board support member.

4. A magnetic head drum as claimed in claim 3, wherein said magnetic head drum has a helical guide path for helically guiding magnetic tape on an outer circumferential face thereof.

5. A magnetic head drum for a data record/read apparatus, comprising:
   a stationary spindle having a longitudinal axis,
   a lower drum mounted fixedly on said stationary spindle,
   a rotary drum rotatably supported on said spindle above said lower drum and having an upwardly opening annular recess,
   an upper drum mounted fixedly on said spindle and accommodated within said recess of the rotary drum with radial clearance from said rotary drum,
   a magnetic head mounted on said rotary drum at an outer periphery of the bottom of said rotary drum,
   a motor for rotating said rotary drum around said spindle, said motor including a stator mounted fixedly on said upper drum within said recess of the rotary drum, a rotor mounted within said recess of said rotary drum for rotation with the latter in confronting relation to said stator, and a back yoke supported on said rotor with said stator being interposed between said rotor and said back yoke within said recess of the rotary drum,
   a flexible circuit board support member secured to said upper drum and extending radially and outwardly therefrom above said rotary drum,
   a flexible circuit board, supported by said flexible circuit board support member, in remote relationship to said rotary drum, and
   connecting means extending through said upper drum for electrically connecting said stator with said flexible circuit board support member, said connecting means including
   a connector mounted on and extending through said upper drum and having a conductive layer thereon, and
   connector pins secured to said stator and said flexible circuit board support member, respectively, and fitted into opposite ends of said connector whereby said connector pins are electrically connected with each other through said conductive layer of said connector.

6. A magnetic head drum as claimed in claim 5, wherein said connector is constituted by a resin tube having a plated inner face.

7. A magnetic head drum as claimed in claim 5, wherein said connector is constituted by a resin tube and said connector pins have interconnecting male and female configurations.

* * * * *